March 27, 1951 — C. H. SMOOT — 2,546,657
INSTRUMENT FOR MEASURING PHYSICAL CONDITIONS
Filed Sept. 26, 1947 — 2 Sheets-Sheet 1
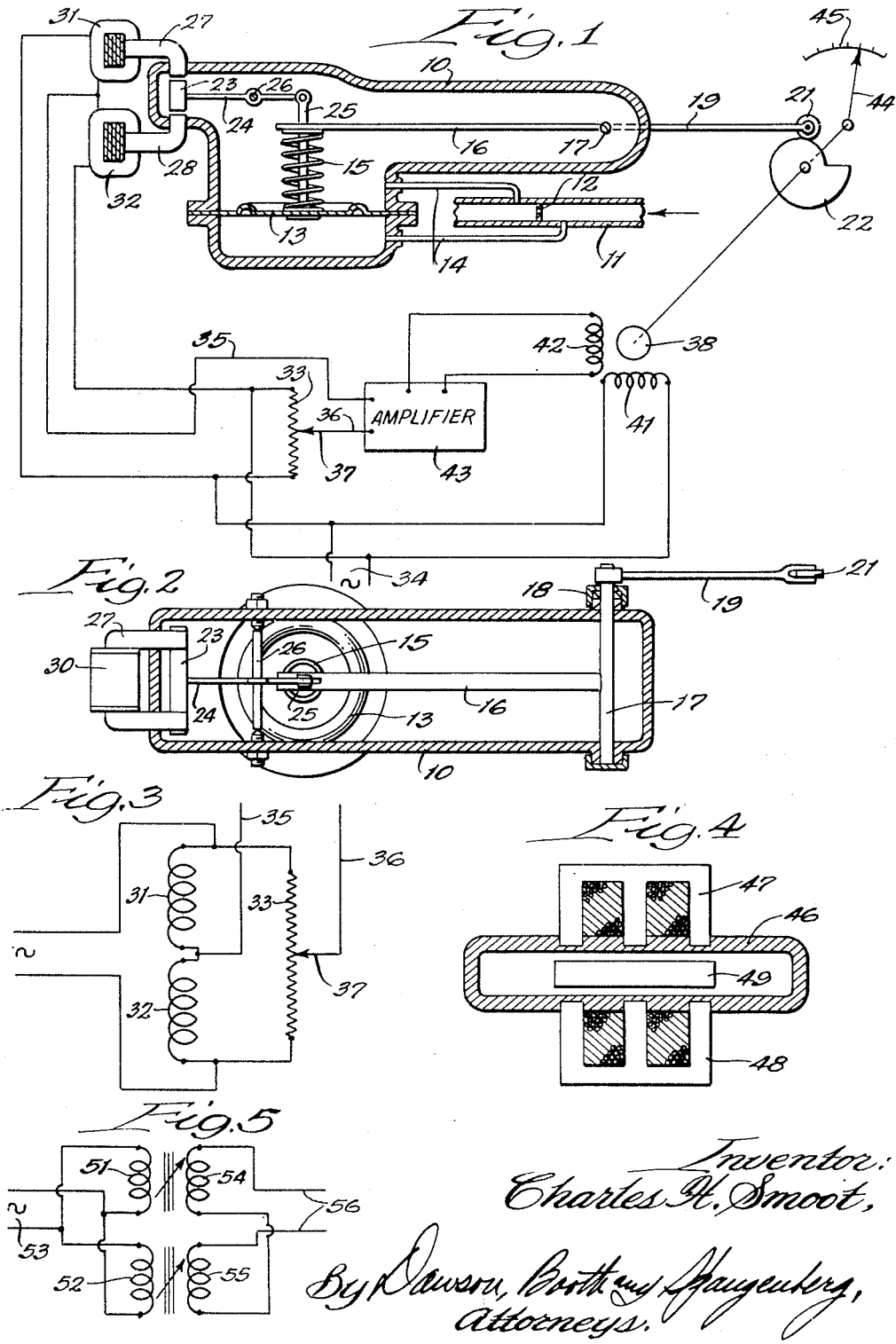

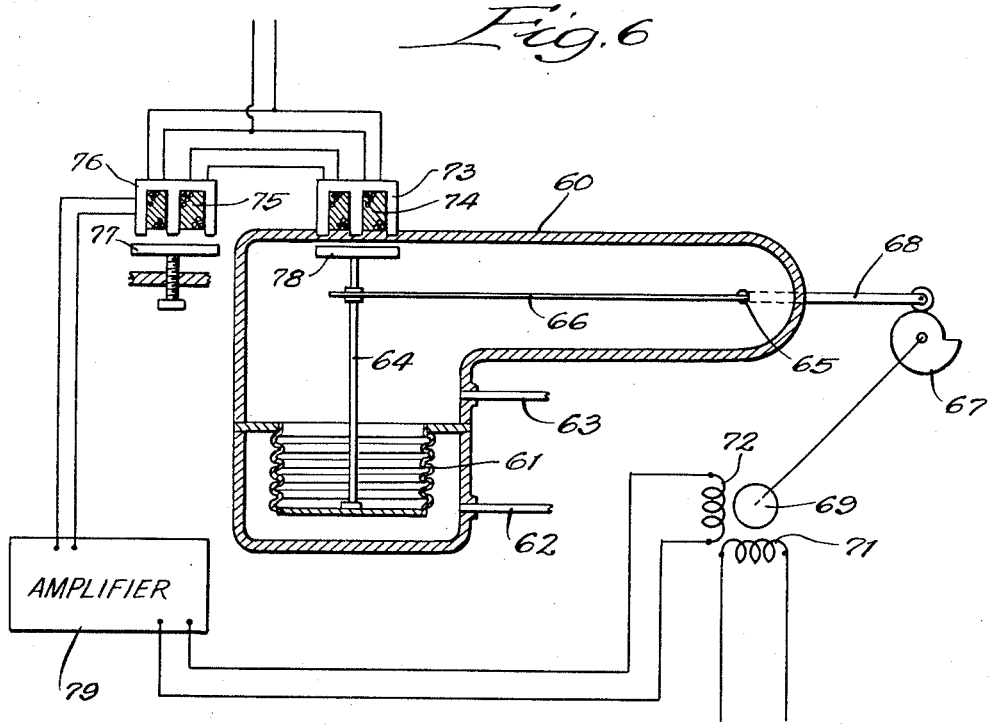

Patented Mar. 27, 1951

2,546,657

UNITED STATES PATENT OFFICE 2,546,657

INSTRUMENT FOR MEASURING PHYSICAL CONDITIONS

Charles H. Smoot, Chicago, Ill., assignor to Republic Flow Meters Company, Chicago, Ill., a corporation of Illinois Application September 26, 1947, Serial No. 776,190

2 Claims. (Cl. 318—32)

This invention relates to instruments for measuring physical conditions and more particularly to instruments for sensing changes in a condition and for producing movements proportional to the changes.

One of the objects of the invention is to provide an instrument functioning on the force balance principle and in which the forces are unaffected by friction.

Another object is to provide an instrument in which the sensitive parts of the instrument are enclosed in a sealed housing and both the condition responsive force and the balancing force are developed within the housing, thereby eliminating the necessity of transmitting either of these forces through a seal.

Still another object is to provide an instrument which may operate in response to pressure variations without being affected by changes in static pressure.

A further object is to provide an instrument in which movements of a sensitive element in a housing are detected electrically without requiring any moving parts extending through the housing.

The above and other objects and advantages of the invention will be more readily apparent from the following description when read in connection with the accompanying drawing, in which—

Figure 1 is a diagrammatic view with parts shown in section of an instrument embodying the invention;

Figure 2 is a partial horizontal section with parts in elevation;

Figure 3 is a circuit diagram;

Figure 4 is a partial vertical section illustrating a modified electrical detecting arrangement;

Figure 5 is a circuit diagram of the electrical arrangement of Fig. 4; and

Figure 6 is a view similar to Fig. 5 of an alternative construction.

The instrument, as shown, comprises a closed sealed housing indicated generally at 10 which may be formed of any desired material and which may be made in a plurality of parts to be assembled together in sealed relationship. Regardless of how formed, the housing when assembled provides a hollow housing structure whose interior is completely sealed and which is adapted to contain the sensitive parts of the instrument.

The instrument of the present invention may be employed to measure any desired physical condition such as temperature, pressure, flow, density, or the like. By way of illustration, it is shown as measuring the flow through a conduit 11 which is provided with a restricted orifice 12. For this purpose, the housing 10 carries a flexible diaphragm 13 whose edges may be tightly sealed in the housing and whose opposite surfaces may be connected by conduits 14 to the opposite sides of the restriction 12. When flow through the pipe is from the right to the left, as indicated by the arrow, the diaphragm will be urged upward with a force which is proportional to the square of the rate of flow. It will be noted that the portion of the housing below the diaphragm is subjected to the up-stream pressure, while the entire portion thereof above the diaphragm is subjected to the down-stream pressure. Since all of the parts are enclosed within the housing, it will be seen that any change in static pressure surrounding the instrument will not affect it. The upward force on the diaphragm 13 is balanced by a spring 15 which engages the upper side of the diaphragm and the free end of a lever 16. The lever 16 is carried by a cross shaft 17 one end of which extends through the housing and which is sealed against the housing by a seal indicated generally at 18. Since the friction of the seal 18 in no way affects either the accuracy or the sensitivity of the instrument, as will appear hereafter, the seal may be made tight without regard to friction imposed thereby on the cross shaft 17. Outside of the casing, the shaft 17 carries an extension arm 19 having a roller 21 thereon which engages a rotatable cam 22.

Movement of the diaphragm 13 in response to a change in the condition to be measured moves a magnetic armature 23 which is supported on a lever 24 connected by a rod 25 to the diaphragm. The lever 24 is pivoted intermediate its ends on a supporting shaft 26 extending across the casing and supported in metal bearings thereon. The friction of the these bearings is the only friction affecting in any way the sensitivity of the instrument, and since only a very light load is ever imposed on the bearings, they can be made substantially without friction.

The armature 23 forms a part of an electrical sensing mechanism to sense the movements of the diaphragm 13 and to adjust the cam 22 in accordance therewith to rebalance the instrument. The remainder of the electrical sensing mechanism, as shown in Figs. 1, 2, and 3, comprises a pair of magnetic cores 27 and 28 which are mounted opposite to each other in the opposite walls of a relatively narrow portion of the housing 10. Either this narrow portion adjacent the cores 27 and 28 or, if desired, the entire housing will be made of non-magnetic material. As shown in Fig. 2, each of the cores has a pair of spaced holes which extend through and are rigidly secured in the housing. Since no relative movement is required, the connection between the cores and the housing can easily be made of a permanent fluid tight nature as by brazing, soldering, or the like. The core 27 carries a winding 31 and the core 28 carries a similar winding 32, the two windings being connected in a bridge circuit with a resistor 33. The bridge circuit is supplied with alternating current from a source 34 and its output is through a wire 35 from the mid-point between the windings 31 and 32 and a wire 36 connected to a zero adjustment wiper 37 which is movable over the resistor 33. When the bridge circuit is balanced, there will be no output voltage across the wires 35 and 36, but upon an unbalance, due, for example, to shifting of the armature 33, an alternating voltage will appear across the wires 35 and 36 whose phase relationship with respect to the voltage source 34 will depend upon the direction of unbalance.

The voltage across the wires 35 and 36 controls a reversible electric motor including a rotor 39 which is connected to the cam 22. The motor includes a field winding 41 which is connected to the alternating source 34 and a control winding 42 which is connected through an amplifier 43 across the wires 35 and 36. When no voltage is present across the wires 35 and 36, the motor will remain stationary, but when a voltage appears across these wires, the motor will turn in one direction or the other depending upon the phase of the voltage.

In operation, assuming that the condition responsive force produced by the diaphragm 13 and the balancing force of the spring 15 are balanced, the parts will occupy a neutral position in which the bridge circuit is balanced and the motor is stationary. Upon a change in the condition, for example, an increase in flow through the conduit 11, the diaphragm 13 will move upward to move the armature 23 down toward the core 28. As the armature moves closer to the core 28 and further from the core 27, the reluctance of the magnetic path of the core 28 decreases and that of the core 27 increases. This produces an increase in the inductance of the winding 32 and a decrease in the inductance of the winding 31 to unbalance the bridge circuit. It will be understood that the movement involved is very slight, being in the nature of a few thousandths of an inch at the most. When the bridge circuit is unbalanced, the motor is caused to operate in the proper direction to turn the cam 22 clockwise to swing the arm 19 and lever 17 counter-clockwise to increase the compression of the spring 15 to rebalance the force exerted by the diaphragm 13. The cam 22 may be properly shaped so that its position will become an indication of the condition to be measured and a pointer 44 may be connected thereto moving over a scale 45 to indicate the present value of the condition. When the parts are again balanced, for the existing rate of flow, the motor will stop and the parts will remain in stationary balance until another change occurs.

It will be noted that the instrument operates in accordance with the force balance principle by balancing the diaphragm force against the force of the spring 15. Since these parts are wholly enclosed within the housing, they are unaffected by friction or by changes in static pressure. The force exerted by the spring 15 is determined by the position of the lever 16 which is the only element affected by friction. However, ample power may be provided through the motor and the cam to swing the lever 16 easily to any new position required. Since the balancing force is dependant wholly upon the position of the lever irrespective of the force required to move the lever, it will be seen that the friction in the packing 18 does not in any way affect either the sensitivity or the accuracy of the instrument.

Figs. 4 and 5 illustrate a modification of the electrical sensing mechanism and of the electrical circuit employed. As shown in these figures, a hollow non-magnetic housing part 46 is provided which is relatively narrow in one direction. In its opposite faces, the housing part is formed with a plurality of sockets or recesses extending only partially through the housing walls from the outside. These sockets or recesses receive the ends of pole pieces or magnetic cores 47 and 48 so that the ends of the pole pieces lie relatively close to the interior surface of the housing without actually extending through the housing. Thus, the fluid tight condition of the housing is not destroyed and the necessity of soldering or brazing the pole pieces in place is eliminated. A magnetic armature 49, similar to the armature 23, is movable in the housing toward and away from the cores to vary the effective permeability of the cores.

The electrical circuit, as shown in Fig. 5, comprises a pair of primary windings 51 and 52 connected in parallel to an alternating current source 53. The primary windings cooperate respectively with secondary windings 54 and 55 to induce opposing voltages therein. The corresponding terminals of the secondary windings are connected to an output circuit 56 connected either directly or through an amplifier to the control winding of a motor. One of the primary windings and its corresponding secondary winding, for instance, windings 51 and 54, are mounted on the core 47, while the other primary winding and secondary winding are mounted on the core 48.

In operation, when the armature 49 is centered between the cores, the coupling between the respective primary and secondary windings is equal so that equal and opposite voltages are induced in the secondary windings. As a result, no voltage appears in the output circuit 56. When the armature is deflected, as, for example, upward, the coupling between windings 51 and 54 is increased, while the coupling between windings 52 and 55 is decreased. Thus, a voltage equal to the differential between the induced voltages and having the phase of the voltage induced in winding 54 will appear in the output circuit 56 to operate the motor in one direction. If the armature moves in the opposite direction, a greater voltage will be induced in the secondary winding 55 so that a voltage having the same phase as that in winding 55 will appear across the output circuit 56 to operate the motor in the opposite direction.

Fig. 6 illustrates an alternative construction which is in some respects the preferred form. As shown in this figure, the instrument comprises a closed casing 60 in which a flexible diaphragm 61 shown as a bellows is mounted. Connections 62 and 63 conduct a pressure, as, for example, the drop across a restriction in a flow conduit, to the opposite sides of the diaphragm. A rod 64 is centrally connected to the diaphragm to be moved longitudinally thereby. A cross shaft 65 is journaled in the casing and extends therethrough, preferably through a fluid tight seal. The cross shaft carries an elongated leaf spring 66 which is secured at its free end to the rod 64 so that the rod is supported and guided solely by the diaphragm and the spring.

The spring force is varied by a cam 67 engaging a roller on a lever 68 which is connected to the shaft 65 outside of the housing. The cam is driven by a motor including a rotor 69 connected to the cam and having a field winding 71 and a control winding 72. The winding 71 may be connected to any convenient alternating current source and the winding 72 is controlled in response to movement of the diaphragm.

For this purpose, as shown, a magnetic core 73 is mounted in a non-magnetic wall portion of the casing and, preferably, has two pole pieces fitting into recesses in the casing wall, as shown in Fig. 4. The core carries windings 74 which are connected in circuit with windings 75 on a similar core 76. The circuit may be as shown in Fig. 5, although other desired types of circuits could be employed. The magnetic reluctance of the core 76 can be manually adjusted by moving an armature 77 toward and away from the core for the purpose of adjusting the circuit. The reluctance of the core 73 is automatically varied by moving an armature 78 toward and away from its pole pieces in accordance with movement of the diaphragm 61. As shown, the armature 78 is directly mounted on and supported by the rod 64.

Unbalance of the circuit due to movement of the armature 78 controls an amplifier 79 which is connected to the control winding 72 of the motor. As the armature 78 moves in one direction due to variation of the forces exerted by the diaphragm 61, the motor will be caused to turn in the proper direction to vary the force of the spring 66 so that it will rebalance the diaphragm. Thus, the position of the cam becomes a direct measure of the force exerted by the diaphragm and consequently the value of the condition to be measured or controlled.

While several embodiments of the invention have been shown and described in detail, it will be understood that they are illustrative only and are not intended to be a definition of the scope of the invention, reference being had for this purpose to the appended claims.

What is claimed is:

1. An instrument for measuring physical conditions comprising a closed housing, a sensitive element in the housing responsive to a condition to be measured to produce a force proportional to the value of the condition, a cross shaft in the housing projecting therethrough, a leaf spring connected at one end to the cross shaft and at its other end to the sensitive element to oppose the force of the sensitive element, a device for producing a variable electrical effect including a pair of relatively movable parts, one of which is rigidly mounted adjacent the housing and the other of which is in the housing and is connected to the sensitive element to be moved thereby, a reversible motor, means responsive to the electrical effect to control the motor, and means connecting the motor to the cross shaft to turn the shaft.

2. An instrument for measuring physical conditions comprising a closed housing, a flexible diaphragm in the housing responsive to a condition to be controlled to produce a force proportional to the condition, a rod connected to the diaphragm, a shaft rotatable in the housing, a leaf spring secured at one end to the shaft and at its other end to the rod, the diaphragm and the leaf spring providing the sole guide and support for the rod, a device for producing a variable electrical effect including a pair of relatively movable parts, one of which is rigidly mounted adjacent the housing and the other of which is carried by said rod, a reversible motor, means responsive to said electrical effect to control the motor, and means connecting the motor to the shaft to control the shaft.

CHARLES H. SMOOT.

REFERENCES CITED

The following references are of record in the file of this patent:

UNITED STATES PATENTS

| Number | Name | Date |
|---|---|---|
| 1,406,377 | Harvey | Feb. 14, 1922 |
| 2,005,884 | Bernarde | June 25, 1935 |
| 2,027,140 | Alexanderson | Jan. 7, 1936 |
| 2,053,885 | Weeks | Sept. 8, 1936 |
| 2,276,816 | Bagno | Mar. 17, 1942 |
| 2,305,878 | Krussmann et al. | Dec. 22, 1942 |
| 2,358,103 | Ryder | Sept. 12, 1944 |
| 2,371,236 | Gille et al. | Mar. 13, 1945 |
| 2,395,604 | Yeida | Feb. 26, 1946 |
| 2,417,097 | Warshaw | Mar. 11, 1947 |

OTHER REFERENCES

"Analysis and Design of Translator Chains," by H. Ziebolz. Published by Askania Regulator Co., Chicago, Ill., Sept. 25, 1946. Vol. 1, pp. 80–81; vol. 2, Fig. 97.